Oct. 11, 1960

W. C. HASSELHORN 2,955,684

FLUID OPERATED CLUTCH OR BRAKE

Filed June 24, 1955

INVENTOR.
Walter C. Hasselhorn
BY
Thiess, Olsen, Mecklenburger,
van Holst, & Coltman. Attys.

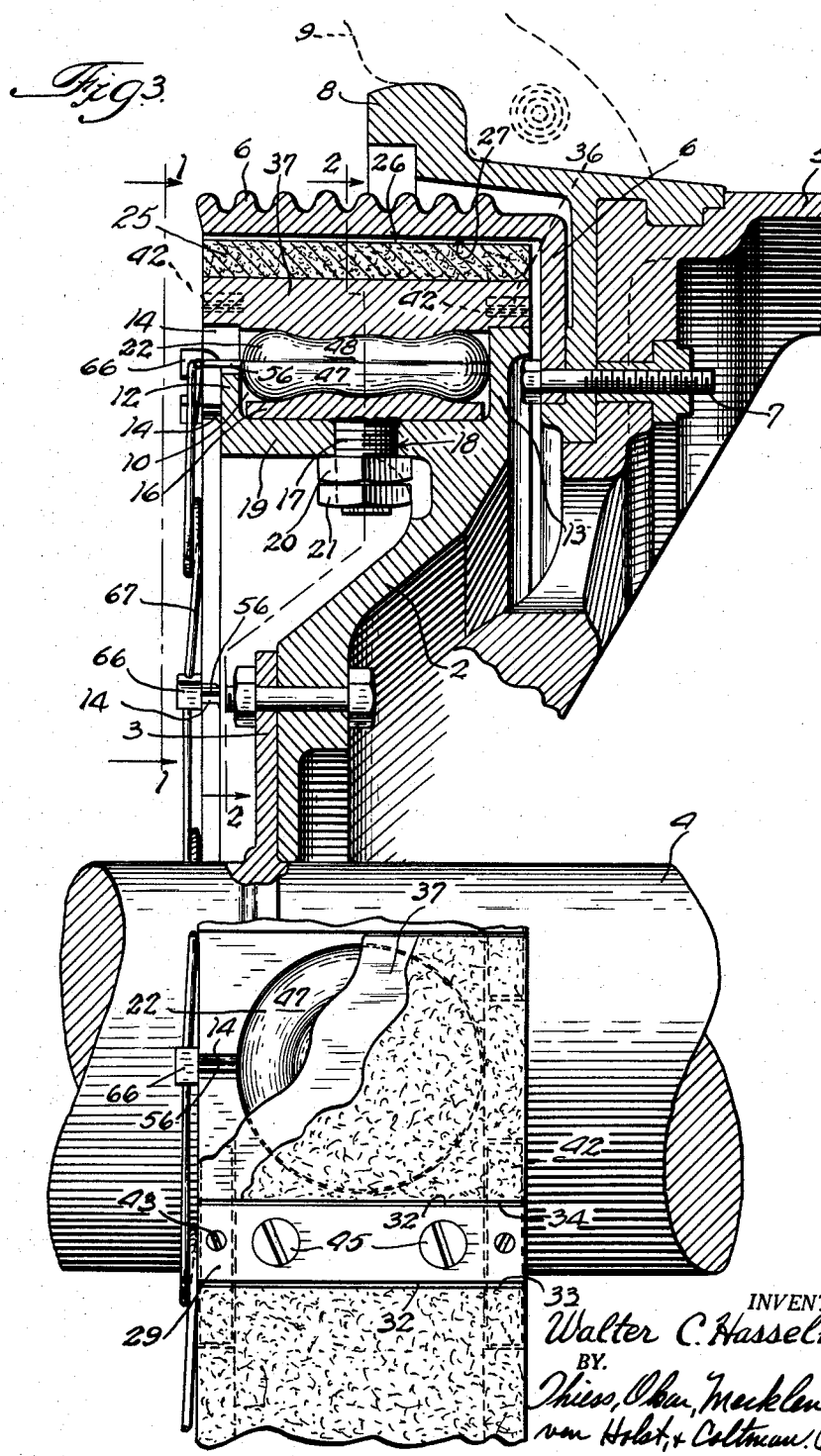

Oct. 11, 1960 W. C. HASSELHORN 2,955,684
FLUID OPERATED CLUTCH OR BRAKE
Filed June 24, 1955 4 Sheets-Sheet 3
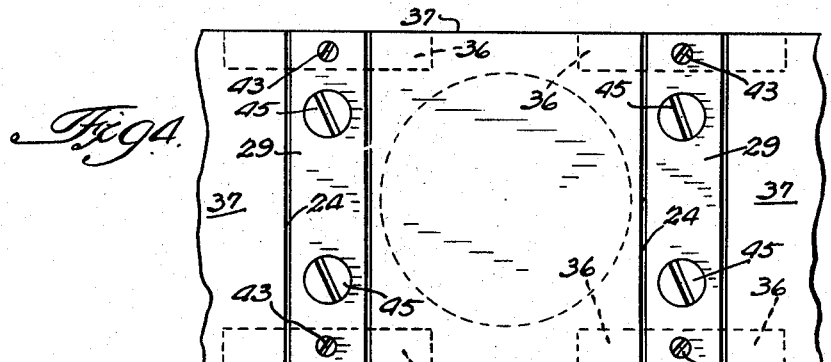
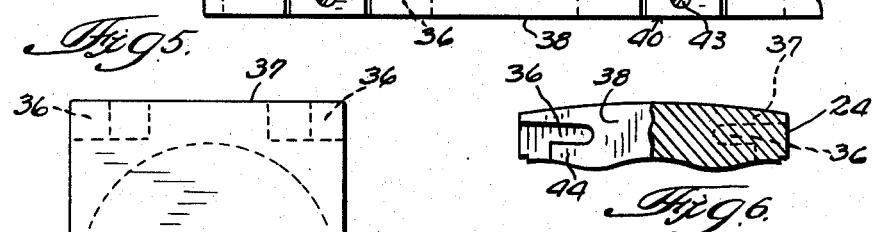
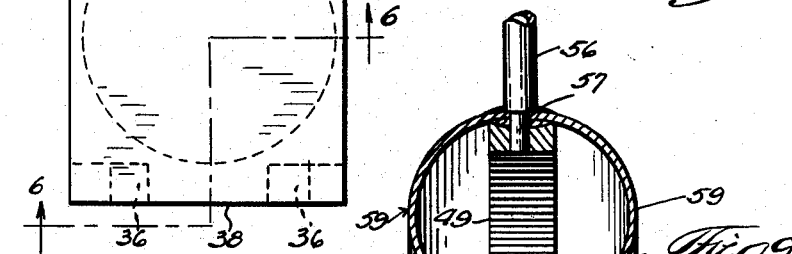
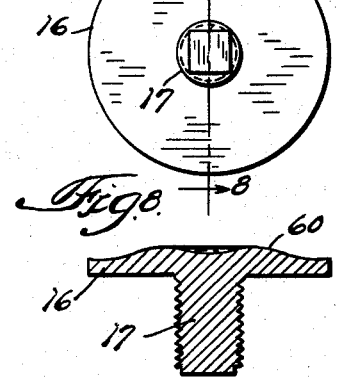
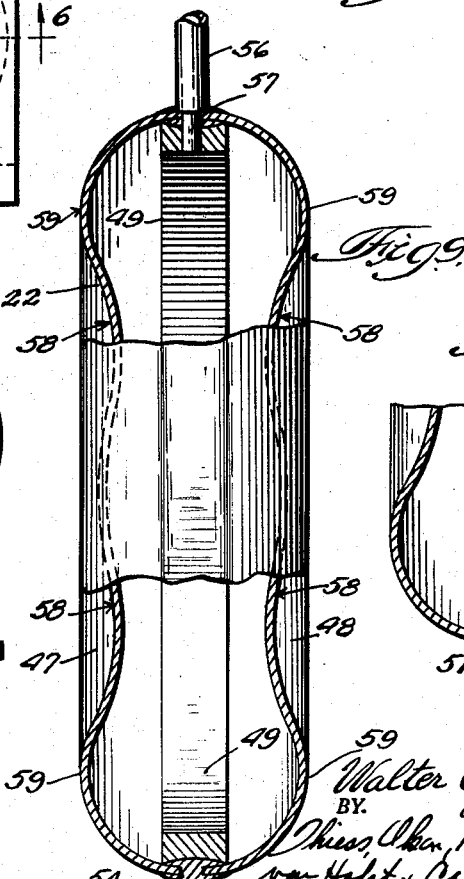
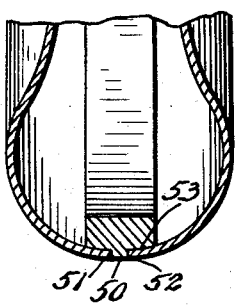
INVENTOR.
Walter C. Hasselhorn.
BY Oct. 11, 1960 W. C. HASSELHORN 2,955,684
FLUID OPERATED CLUTCH OR BRAKE
Filed June 24, 1955 4 Sheets-Sheet 4
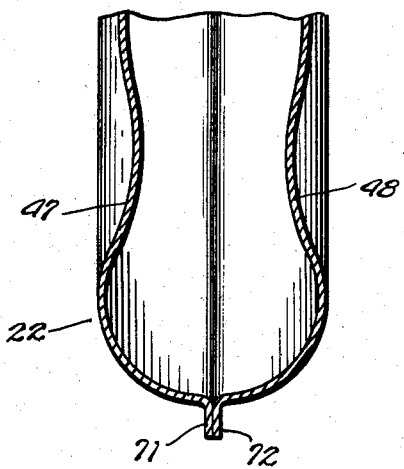
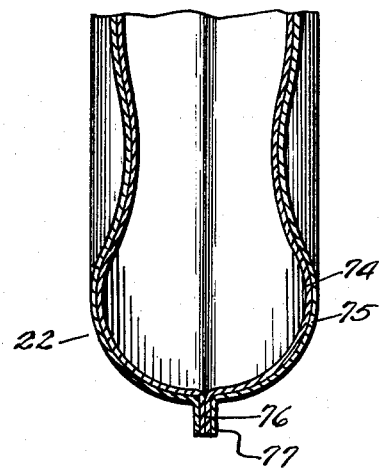
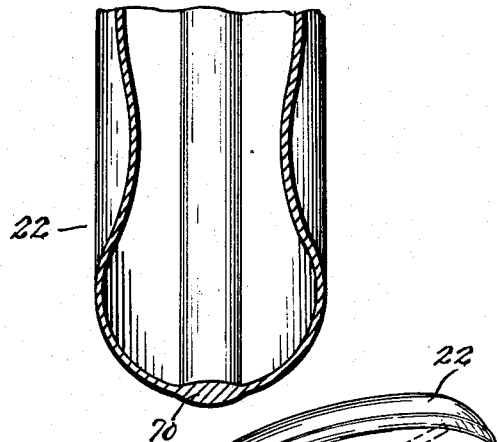
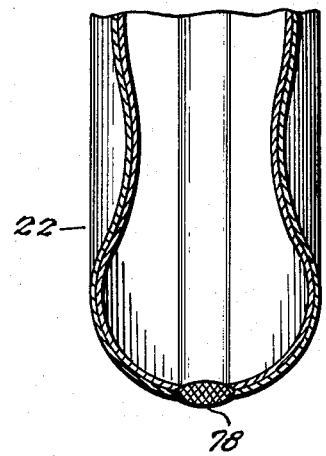
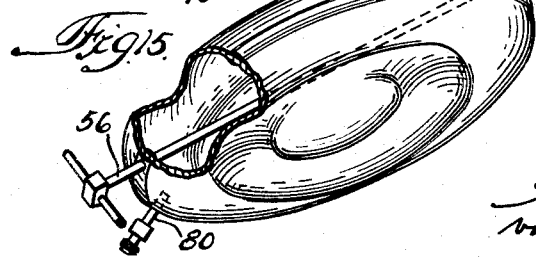
INVENTOR.
Walter C. Hasselhorn.
BY
Thiess, Olsen, Mecklenburger,
van Holst, & Coltman. Attys.

United States Patent Office 2,955,684
Patented Oct. 11, 1960

2,955,684

FLUID OPERATED CLUTCH OR BRAKE

Walter C. Hasselhorn, Evanston, Ill., assignor, by mesne assignments, to Cook Electric Company, Chicago, Ill., a corporation of Delaware Filed June 24, 1955, Ser. No. 517,840

9 Claims. (Cl. 188—78)

This invention relates to brake mechanisms and particularly to brake mechanisms applicable to the landing gear of heavy aircraft.

Structure of the type designed for braking the rotating wheels of aircraft landing gears is well known. Since this type of structure was first designed, aircraft have increased considerably in both weight and size, and it has been found that the former types of brake structures fail to provide the protection and safety required. This was the case because the severe braking conditions of heavy loads and larger aircraft resulted in excessive temperatures which could not be compensated in the construction of the braking mechanism. Usually this braking mechanism included in actual use a tube of rubber composition, fabric, or the like, which expanded under fluid pressure to apply braking power to the brake shoes. The excessive temperature soon destroyed the tubular element and the brake shoes and rendered the braking power ineffective. This required frequent replacement without providing the safety factor so necessary in this type of construction. Moreover, the very nature of the tubular member required considerable time to effect replacement because the entire wheel had to be dismantled, including the brake shoes and parts holding the same in position.

An object of the present invention is to provide an improved type of brake mechanism adapted to effect the necessary braking power under heavy loads without being affected by high temperatures and to provide for easy replacement of any portion in minimum time.

A further object of the invention is to provide a braking mechanism that employs a new and efficient form of hydraulically expanding capsule of resilient metal to apply the pressure effecting the braking action.

A still further object of the invention is to provide metallic capsules of new and improved design that may be annularly arranged in the required number between the torque frame and the brake drum and connected in a hydraulic system, the capsules having new and unusual properties to withstand the severe duty imposed thereon when braking power is applied.

A still further object of the invention resides in the novel form of take-up mechanism that can adjust for wear of the braking material or adjust for greater braking pressure engagement of the capsules against the brake shoes, the structure affording a quick and simple take-up that may be handled in minimum time and very effectively.

The metallic capsules are constructed to withstand high temperature and high braking pressure, the supporting structure also being simple and housing the capsules in a manner to protect them and their pressure expansible surfaces from dirt or foreign substances, each capsule preferably consisting of two identical metal disks and a metal ring with peripheral shoulders, the disks being slipped over the ring and held tightly against the shoulders while the projecting portion of the ring is welded over all the way about the circumference so as to join the two disks and the ring securely together, the ring providing a reinforcement of great strength at the weld and material of sufficient thickness to receive the hydraulic tubing connected through a drilled hole in the ring between the two disks.

Other objects and advantages of the invention will be apparent from the following detail description when taken in connection wtih the accompanying drawings which form a part hereof.

In the drawings:

Fig. 3 is a sectional detail taken substantially along the line 3—3 of Fig. 1 and looking in the direction of the arrows;

Fig. 4 is a top elevation of a single brake unit and capsule in dotted lines to illustrate the form of attachment of each unit to the torque frame;

Fig. 5 is a similar view of the shoe forming a part of the brake unit;

Fig. 6 is a sectional detail, partly in section and partly in elevation, taken along the line 6—6 of Fig. 5 and looking in the direction of the arrows;

Fig. 7 is an elevational detail of the underside of the capsule adjustment plate;

Fig. 8 is a sectional detail view taken along line 8—8 of Fig. 7 and looking in the direction of the arrows;

Fig. 9 is a detail view, partly in elevation and partly in section, of the resilient-metallic capcule;

Fig. 10 is a detail section to illustrate the construction of the capsule.

Fig. 11 is an enlarged detail sectional view of a modified form of capsule construction shown before the welding operation;

Fig. 12 is a similar view of the same structure but after the welding operation;

Fig. 13 is another enlarged detail sectional view similar to Fig. 11 but showing a still further modification of the capsule;

Fig. 14 is a similar view of the same structure but after welding; and

Fig. 15 is a detail view showing a portion of the capsule wall broken away to illustrate the method of purging the air therefrom while filling it with a braking fluid.

Figure 1:
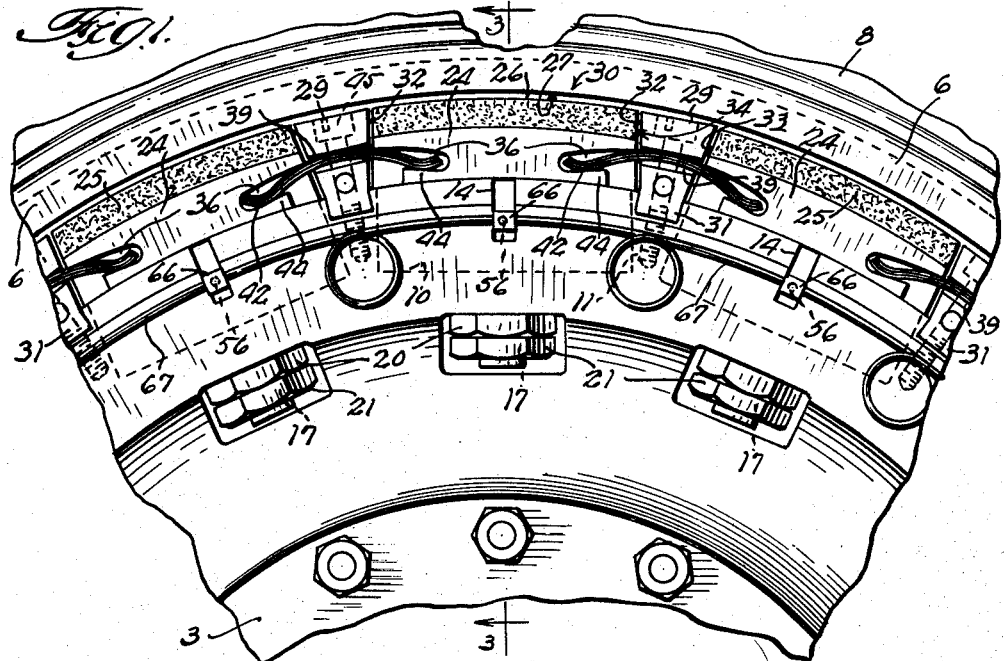
Figure 1 is an elevational view, with parts broken away and removed, of the wheel of an aircraft landing gear embodying principles of the present invention and having a plurality of resilient-metallic capsules that expand radially outward to apply braking power to the brake drum.

Referring to the drawings, the preferred embodiment of the invention includes broadly a torque frame 2 which may be fastened to a torque flange 3 of a torque shaft 4. The torque frame is located adjacent the usual rotatably mounted wheel designated broadly as 5 which has a brake drum 6 fixed thereto in any conventional way, as by bolts 7 or the like. As is well understood, a rim 8 is adapted to seat a pneumatic tire 9.

Torque frame 2 is formed with a plurality of circumferentially spaced pockets 10 divided by integral transverse wall partitions 11. Each pocket 10 has side walls 12 and 13 and a transverse slot 14 in wall 12. Seated in each pocket is an adjustment plate 16 having a threaded shank or stud 17 adapted to screw into a threaded opening 18 in the floor wall 19 of pocket 10. An adjusting nut 20 and a locking nut 21 are provided to hold plate 16 in the position to which it has been adjusted. Thus, by loosening adjusting nut 20 and locking nut 21 it is possible to rotate plate 16 and thereby raise or lower its position in pocket 10. In this manner the radial position of capsule 22 may be adjusted to compensate for wear in the brake lining materials and to obtain uniform braking response from each of a plurality of pressure responsive capsules 22 which may be utilized in a brake assembly.

Each pocket 10 is adapted to receive one of the pressure expanding capsules 22 and a brake shoe 24 that forms a part of the brake unit 30, including a lining of brake material 25 providing a frictional surface 26 adapted to engage the frictional braking surface 27 of brake drum 6. Brake material 25 is preferably formed of molded heat resistant composition and is adapted to be forced into frictional engagement with the braking surface 27 of brake drum 6 when capsules 22 are expanded and to clear this braking surface 27 of the brake drum when the capsules 22 are deflated. Wall partitions 11 are provided with slots 28 in their top face to receive transverse spacer blocks 29. Spacer blocks 29 are adapted to have a reduced shank 31 tightly fitting into slot 28 and opposite tapered faces 32 that are spaced relatively close to but not in contact with opposite side walls 33 and 34 of adjacent brake shoes 24 and the brake material 25, respectively. Enough space is allowed between these walls 32, 33 and 34 to permit each brake unit 30 to operate freely either when the capsules 22 are expanded or when the capsules are returned to deflated position by retracting means to be presently described. Braking material 25 may be secured to the brake shoe 24 by any well-known means, the latter preferably being of metal and in certain instances of aluminum in order to assist in dissipating high temperatures when braking power is applied to the braking drum 6 and also to reduce weight which is so desirable in aircraft construction.

To provide for retracting each brake unit 30 when the braking power is withdrawn, each brake shoe 24 is formed with a groove 36 at its four corners and along its side faces 37 and 38, the grooves 36 being also open along these side faces 37 and 38 and at their ends. As illustrated in Fig. 1, spacing blocks 29 likewise have horizontal slots 39 in their outer faces 40 and 41, respectively (see Fig. 4). These slots 39 are opposite slots 36 in brake shoe 24. Leaf springs 42 preferably of S shape are mounted in slots 39 and locked against displacement by pins 43. It will be observed that the curved tips of the S leaf springs fit into slots 36 and bear against the shortened floor wall 44 of slots 36. Spacer blocks 29 are held seated in slots 28 between the brake units 30 by bolts 45. It will be noted that this structure, including the spacing blocks 29 and retracting leaf springs 42, provide a very simple, light and effective form of means to hold the brake units 30 in cooperative position with capsules 22, and, at the same time, afford a very quick and economical way to replace any of the parts of a unit including capsules 22 and adjusting plates 16.

The capsules 22 are designed to have unusual properties as the result of the severe performance needed to exert the necessary braking force for large and heavy aircraft and to withstanding the resulting high temperatures. The construction of these capsules 22 consists preferably of two identically formed metal disks 47 and 48 slipped over the periphery of a ring 49 and brought up tightly against projection 50. While these two disks 47 and 48 are held tightly against the central ring 49, an electric welding torch (not shown) passes all the way around the circumference of projection 50, thus securely joining the two disks in their peripheries 51 and 52. It will be observed that ring 49 is brought tightly against the inside peripheral surface 53 of each disk so that in effect this central ring provides reinforcement for the welded material 54 illustrated in Fig. 9. It will be observed that ring 49 not only acts as a reinforcement for the welded material to provide a structure that is many times more durable than a plain weld, but also provides material of sufficient thickness to properly support a hydraulic tubing 56 which may be brought in through a hole 57 drilled in ring 49 between the two disks. Tubing 56 may then be brazed or welded as desired to ring 49. There are preferably seven steps involved in making each expanding capsule 22. It is suggested that first, a heliarc weld be made at two places substantially 180° apart about the periphery of these disks 47 and 48 while being initially held tightly over and upon ring 49 at projection 50. Step No. 2 involves drilling the hole 57 in the center of one of these welds. Step No. 3 involves welding the remainder of the unit between the two original or initial welded spots. Step No. 4 involves inserting tubing 56 in position in slot 57 and either brazing or welding the same. Step No. 5 involves heat treating the entire unit substantially at 2050° F. or thereabouts for one hour. Step No. 6 involves cooling the same at room temperature, and step No. 7 finally involves vapor honing the unit.

Figure 2:
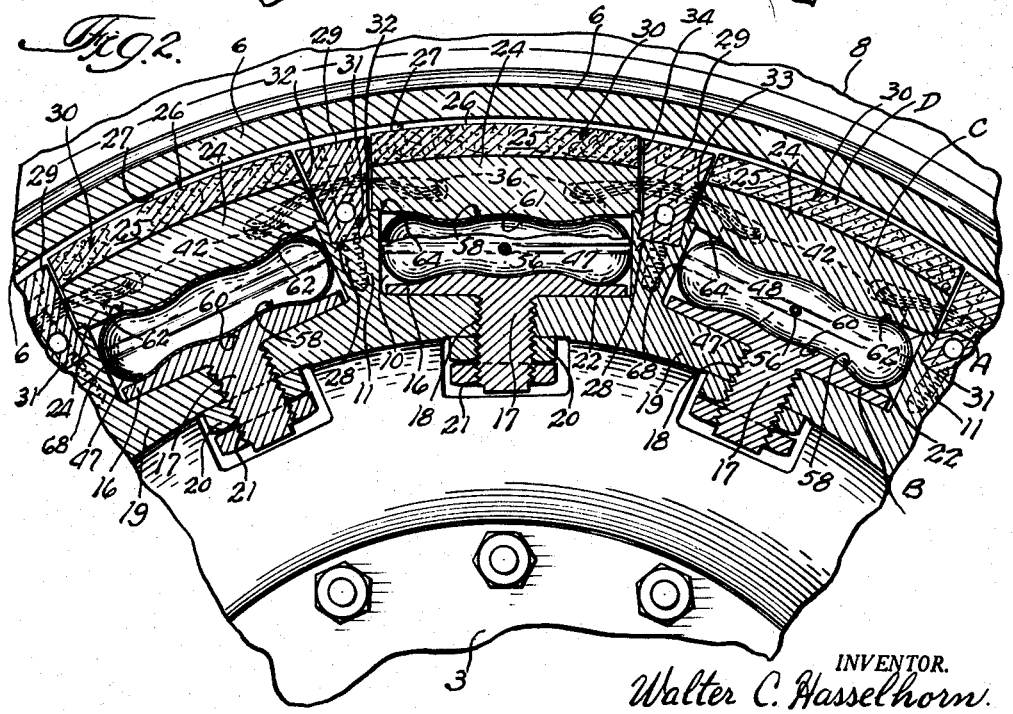
Fig. 2 is a fragmentary sectional detail with parts broken away and removed to show several of the resilient-metallic capsules seated in suitable pockets in the torque frame.

It will be noted that disks 47 and 48 are each provided with a flexing area 58 that extends substantially from the curved portions 59 near the outer periphery. It will be seen in Fig. 2 that the surface of brake shoes 24 and the adjusting plates 16 have contours which effectively mate those contours of capsule 22 which extend approximately from the beginning of the curved portions 59 across the flexing area 58. In other words, each plate 16 has a face 60 mating the contour of the flexing area engaging the same so that each of the adjusting plates 16 is in surface contact across the flexing area 58 of each expanding capsule engaging the same. Also each brake shoe 24 is likewise provided with a face 61 mating the contour of the flexing area 58 of capsule 22 so that each face 61 will have surface engagement with the flexing area 58 of the capsule engaging the same. The flexing area begins approximately at points 62—62, illustrated in Fig. 2, on each brake shoe 24 which tends to eliminate a strain at the weld 54 at the peripheral side wall 68 of the capsule and confine substantially the greater portion of the flexing area to the surface of disks 47 and 48 that engage the face 61 of the brake shoe 24 or similarly to the face 60 of the adjusting plate 16.

Each brake shoe 24 is provided with a shoulder 64 that is seated within the side faces of transverse wall partitions 11, thereby holding the same properly positioned circumferentially while the leaf springs 42 prevent transverse displacement of any unit about the torque frame. Tubing 56 is adapted to extend through transverse slots 14 in outer wall 12 of torque frame 2 and may be either brazed or welded. Fitting 66 receives sections 67 forming a part of the hydraulic or other pressure system used to expand capsules 22. Transverse slots 14 very aptly permit the tubing sections 56 to enter pockets 10 and still have capsules 22 connected to the tubing 67 that extends circumferentially about the torque frame.

The structure described readily dissipates the heat developed when the braking power is applied to the brake drum. The construction of expanding capsules 22 and the manner in which they are carried in pockets 10 in the torque frame make for a sturdy and strong structure capable of handling substantial braking loads. Surface engagement between the flexing faces 58 of each capsule and the corresponding faces 61 and 60 of brake shoe 24 and adjusting plate 16 facilitates quick dissipation of heat. To adjust for wear of the braking material 25 or to adjust for greater pressure engagement of the capsules against the brake shoe 24, the plates 16 with their threaded studs 17 afford a quick and simple take-up that may be handled in minimum time and very effectively. With the capsules made of resilient metal and having characteristics aforesaid described, the parts making up the entire braking mechanism are simple and inexpensive and capable of easy replacement without requiring the dismantling of the entire wheel.

I have found that material of sufficient thickness at the weld of disks 47 and 48 of each capsule 22 for receiving hydraulic tubing 56 may be obtained without the use of ring 49. In Fig. 11, these disks 47 and 48 may be welded at the peripheries and a controlled thickness secured, as indicated at weld 70 in Fig. 12, through the use of peripheral flanges 71 and 72 of controlled length, which, when welded, will assure a sufficient mass of material at the weld 70. Weld 70 represents only the parent material of disks 47 and 48, no welding rod being used, so that a union or joint stronger than the material itself of disks 47 and 48 is obtained. Also, the thickness and flow of the weld is uniform so that the union is of uniform cross section. This insures that no weak spots can exist where the tubing 56 might thereafter be connected.

Although the braking mechanism disclosed herein has general application and need not be limited to landing gear of aircraft, it is pointed out that when applied to landing gear of aircraft, the lightness and effectiveness of this structure is highly desirable. For example, it is desirable to use leaf springs 42 of the lightest structure possible to retract each brake unit 30 after the braking power is withdrawn. To this end I find that by using a laminated structure for each capsule 22, say of two layers or plies 74 and 75 of .012 inch thick material instead of a single layer of .025 inch thick material, the retractile force necessary to collapse each brake unit 30 and its capsule may be reduced from 800 pounds to approximately 300 pounds, or substantially more than 50 percent less force although the thickness of each of the plies is approximately 50 percent of the thickness of the solid wall capsule. Consequently, the leaf spring structure 42 may be lighter and a considerable saving may be made in weight, cost and effectiveness. Each ply 74 and 75 is likewise provided with peripheral flanges 76 and 77, respectively, of controlled length so as to provide a weld 78 of controlled thickness and cross-sectional configuration or width. Quite obviously, the respective plies 74 and 75 may move with respect to each other during the expansion and contraction of the capsules 22 and be of greater strength and more flexible than a single ply of equivalent thickness. I believe that the application of a laminated construction to the capsule herein disclosed in a braking mechanism is particularly novel because of the benefits obtained.

It will be understood, of course, that tubing 56 may be extended into and to the far side of each capsule 22 as shown in Fig. 15 so that upon filling each capsule the air may be purged therefrom through connection 80 which extends a short distance only into the capsule and then at the opposite side from the tip of tubing 56.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A brake structure comprising a torque frame, a brake drum surrounding said frame, a braking surface for said brake drum, a plurality of brake units, each having a frictional surface to engage said braking surface, a pressure expanding capsule for each brake unit for applying a braking pressure thereto, a pressure system to expand said capsules upon increase of pressure, said capsules each having a body of two metal disks joined at their periphery to a reinforcing ring internally disposed within said body, pockets in said frame for said capsules and said units, an adjustment plate in each pocket, and take-up means extending through the floor of each pocket for said adjustment plate.

2. A brake structure comprising: a torque frame; an element to be braked mounted for rotation around said torque frame; a braking member having a braking surface and a bearing face; an expansible, resilient capsule made up of first and second flexible end walls and an externally convex side wall characterized by substantial rigidity along radii of the said element; and means including said torque frame for movably supporting said member in a position where said braking surface is disposed opposite a surface of said element, said means also supporting said capsule such that the outer surface of said first flexible wall is disposed over at least a portion of the bearing face of said member and the outer surface of said second flexible wall is disposed over at least a portion of a surface of said means, whereby expansion of said capsule will displace the said brake member and cause said braking surface to engage frictionally the said element.

3. A brake structure comprising: a torque frame assembly having a contoured mounting surface defined as a concave outermost concentric portion adjoining $n-1$ concentric portions where $n$ represents an integer, each of said $n-1$ concentric portions having a curvature opposite the curvature of the inner and outer portions adjacent thereto, and a central portion adjoining the innermost of said $n-1$ concentric portions, the said central portion having a curvature opposite the curvature of the innermost of said $n-1$ concentric portions; a brake drum mounted for movement relative to said frame assembly; a braking member mounted on said assembly for radial movement with respect to said assembly, said member having a mounting surface disposed in facing relation to, and of the same contour as the contour of, the mounting surface of said frame assembly; and an expansible capsule mounted between the aforesaid mounting surfaces, the said capsule including means entering a peripheral wall of said capsule for connecting a source of variable pressure to the interior of said capsule, the said capsule further including two metallic, resilient disks joined along their peripheries, each of said disks formed to have an outer surface contour mating with the contour of either of the aforesaid mounting surfaces such that an increase in pressure within said capsule will produce expansion of said capsule in the direction required to produce radial movement of said element thereby causing said member to engage said drum and retard any movement thereof.

4. A brake structure comprising: a torque frame having a plurality of pockets spaced at intervals around an outer peripheral surface; a brake drum mounted for rotation around said torque frame, said drum having a braking surface disposed opposite said pocket openings; a brake shoe and block unit mounted for radial movement between each of said openings and said braking surface; an expansible, resilient capsule generally shaped as an oblate spheroid disposed in each of said pockets such that the two oppositely facing surfaces of each said spheroid of least curvature effectively are in juxtaposition, respectively, with the bottom surface of one of said pockets and the surface of one of said units, whereby expansion of said capsules results in radial displacement of said units and frictional engagement between said brake block and said braking surface.

5. A brake structure comprising: a torque frame; a brake drum surrounding said frame, a braking surface on said brake drum; a plurality of braking members, each of said members having a braking surface adapted to engage the braking surface of said brake drum; a plurality of resilient-metallic, expansible capsules of oblate spheroid shape spaced at intervals around said torque frame having two flexible and opposite walls of reduced curvature, one of said walls of each capsule being juxtaposed against a mating surface of one of said braking members, and the other one of said walls of each capsule effectively supported by said torque frame; elongated, resilient retracting elements engaging the spaced-apart ends of adjacent braking members; and means secured to the said torque frame between adjacent ends of said braking members to maintain said members in spaced-apart relationship and to bias said resilient elements for retraction of said braking members from said braking surface.

6. A brake structure comprising: a torque frame; a brake drum mounted for movement relative to said frame, said drum having a braking surface; a braking member having bearing and frictional surfaces; means including said torque frame for mounting said member for retractable engagement of said frictional surface with said braking surface; a mounting plate adjustably coupled to said torque frame such that a mounting surface of said plate may be positioned toward and away from said braking surface; and an expansible capsule including a first resilient, metallic disc having a surface disposed in face-to-face relation against said mounting surface, and a second resilient, metallic disc peripherally-joined directly to said first disc and having a surface disposed in face-to-face relation against the bearing surface of said braking member.

7. A brake structure comprising: a torque frame; a brake drum mounted for movement relative to said frame, said drum having a braking surface; a braking member having bearing and frictional surfaces; means including said torque frame for mounting said member for retractable engagement of said frictional surface with said braking surface; and an expansible capsule mounted between said torque frame and said braking member for causing said retractable engagement, said capsule including a first resilient, metallic dish disposed in surface-to-surface relation with the bearing surface of said braking member, and a second resilient, metallic dish having a peripheral edge juxtaposed against, and joined to, the peripheral edge of said first dish.

8. A brake structure comprising: a torque frame having a plurality of radially oriented, open pockets spaced around the periphery of said frame; a brake drum having a braking surface spaced opposite the openings of said pockets; a brake block disposed in the space between the said torque frame and the said braking surface opposite each of said openings; a resilient, metallic, expansible capsule in each of said pockets, each of said capsules having end walls in juxtaposition with the said torque frame and a brake block, respectively, and a side wall of outward convexity characterized by substantial rigidity midway between the end walls; spacers disposed between said brake blocks; means coupling said spacers to said frame; and spring members intercoupling said blocks with said spacers and normally maintaining the former retracted in the direction of said frame.

9. A brake structure as represented in claim 7 wherein said first and second dishes have a multi-ply structure and flanges around said peripheries, such that the said dishes may be joined with a weld having parent metal of predetermined cross section.

References Cited in the file of this patent

UNITED STATES PATENTS

| 598,766 | Campany | Feb. 8, 1898 |
|---|---|---|
| 1,189,511 | Vawter | July 4, 1916 |
| 1,723,141 | Down | Aug. 6, 1929 |
| 1,954,158 | Ward | Apr. 10, 1934 |
| 2,115,551 | Farmer | Apr. 26, 1938 |
| 2,123,381 | Reichel | July 12, 1938 |
| 2,359,676 | Raney | Oct. 3, 1944 |
| 2,388,151 | Hunter | Oct. 30, 1945 |
| 2,392,225 | Butler | Jan. 1, 1946 |
| 2,422,121 | Norstrom et al. | June 10, 1947 |

FOREIGN PATENTS

| 763,351 | France | Feb. 12, 1934 |